United States Patent [19]
Tanaka

[11] Patent Number: 5,435,365
[45] Date of Patent: Jul. 25, 1995

[54] PNEUMATIC TIRE

[75] Inventor: Masatoshi Tanaka, Takarazuka, Japan

[73] Assignee: Sumitomo Rubber Industries, Ltd., Hyogo, Japan

[21] Appl. No.: 125,860

[22] Filed: Sep. 24, 1993

[30] Foreign Application Priority Data

Oct. 19, 1992 [JP] Japan .................... 4-306542

[51] Int. Cl.⁶ .................. B60C 101/02; B60C 111/00
[52] U.S. Cl. ........................ 152/209 R; 152/209 A
[58] Field of Search .......... 152/209 R, 209 A, 209 D; D12/146-147

[56] References Cited

U.S. PATENT DOCUMENTS

| | | | |
|---|---|---|---|
| D. 336,275 | 6/1993 | Montag et al. | D12/147 |
| D. 341,361 | 11/1993 | Kuramochi et al. | D12/147 |
| 1,946,367 | 2/1934 | Straight . | |
| 3,405,753 | 10/1968 | Verdier | 152/209 R |
| 3,682,220 | 8/1972 | Verdier | 152/209 R |
| 3,727,661 | 4/1973 | Hoke | 152/209 R |
| 3,893,498 | 7/1975 | Wayne | 152/209 R |
| 4,244,415 | 1/1981 | Peter et al. | 152/209 R |
| 4,345,632 | 8/1982 | Takigawa et al. | 152/209 R |
| 4,617,976 | 10/1986 | Kawajiri . | |
| 4,687,037 | 8/1987 | Pfeiffer et al. | 152/209 R |
| 5,058,643 | 10/1991 | Nakasaki | 152/209 R |
| 5,176,766 | 1/1993 | Landers et al. | 152/209 R |

FOREIGN PATENT DOCUMENTS

| | | |
|---|---|---|
| 2398625 | 7/1978 | France . |
| 2608516 | 12/1987 | France . |
| 0897815 | 11/1953 | Germany . |
| 0122804 | 6/1987 | Japan . |
| 3-139402 | 6/1991 | Japan . |

OTHER PUBLICATIONS

Patent Abstracts of Japan, vol. 015, No. 354 (M-1155) 6 Sep. 1991 & JP-A-03 139 402 (abstract).

*Primary Examiner*—Steven D. Maki

[57] ABSTRACT

A pneumatic tire having a tread portion with a convex profile, a pair of axially spaced bead portions, and sidewall portions extending therebetween. The tread portion is provided with a circumferentially extending continuous groove defining groove edges with at least one circumferential groove having a width of more than 16% of the ground contacting width. The tire design reduces overall tire noise, especially air resonance without deteriorating tire performance on wet surfaces.

8 Claims, 3 Drawing Sheets

PNEUMATIC TIRE

The present invention relates to a pneumatic tire having an improved tread portion capable of reducing tire noise without deteriorating tire performance on wet surfaces.

In recent years, improved automobile designs have reduced the noise generated by the car mechanism and body. Thus the percentage of the noise generated by the tire has comparatively increased correspondingly increasing demand for a low noise tire.

It is especially effective in reducing tire noise to reduce relatively high frequency noise to which the human ears are sensitive, that is, noise whose frequency range is around 1 kHz. Air resonance noise is an example of a high frequency tire noise. The air resonance noise is explained as follows.

In the ground contacting patch of the tire, an air tube is formed between the road surface and a continuous circumferential groove in the tire tread portion. During running, the air tube is excited by the air flow so that a tread deformation or movement, roughness of the road surface and the like generates a noisy sound having a specific wave length which corresponds to two times the length of the air tube. Most of tire noise with a frequency range in the range of about 800 to 1.2 k Hz is generated by a tire having a circumferential groove is such air resonance noise, and the frequency of air resonance is almost constant independent of the running speed.

Since it has been known that air resonance can be reduced by decreasing groove volume, in order to reduce air resonance noise, conventional methods of reducing tire noise having decreased the groove volume and/or the number of circumferential grooves. As a result, decreased performance on wet surfaces such as hydroplaning, wet grip and the like have inevitably occurred.

SUMMARY OF THE INVENTION

It is therefore, an object of the present invention to provide a pneumatic tire in which, by reducing the air resonance noise, the overall tire noise is reduced without sacrificing performance on wet surfaces.

According to one aspect of the present invention, a pneumatic tire includes a tread portion with tread edges, a pair of axially spaced bead portions, and sidewall portions extending therebetween, the tread portion having a convexly curved profile having a single radius or multiple radius, the tread portion being provided with a circumferential groove extending continuously in the tire circumferential direction of the tire, defining groove edges, such that the circumferential groove having a width of more than 16% of the ground contacting width.

BRIEF DESCRIPTION OF THE DRAWINGS

Preferred embodiments of the present invention will now be described in detail in conjunction with the accompanying drawings, in which.

DETAILED DESCRIPTION OF THE PREFERRED EMBODIMENTS

Figure 1:
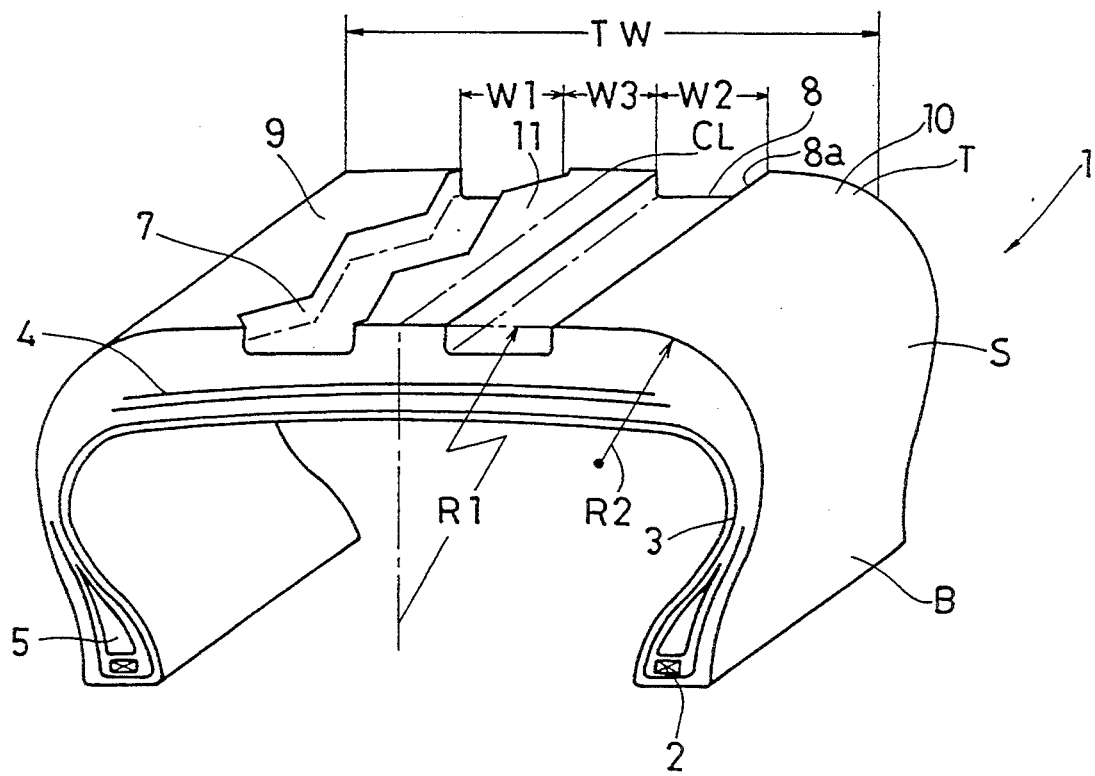
FIG. 1 is a perspective sectional view of a preferred embodiment of a pneumatic tire according to the present invention.

In FIG. 1, the tire 1 is a passenger radial tire having an aspect ratio (tire section height/tire width) of from 0.4 to 0.6.

The tire 1 includes a radial ply carcass 3 extending between bead portions B through a tread portion T and sidewall portions S, and turned up around bead cores 2 in the bead portions from axially inside to outside of the tire a belt 4 is disposed radially outside of the carcass 3 and inside of the tread portion T. and a bead apex 5 is located between the main portion and each turned up portion of the carcass and extends radially outwardly of the bead core 2.

The carcass 3 contains at least one ply of radially arranged organic fiber cords such as nylon, rayon, polyester and the like.

The belt 4 has a plurality of cross plies of high modulus cords such as steel, aromatic polyamide and the like laid at a relatively small angle of from 15 to 30 degrees with respect to the tire circumferential direction.

The tread portion T has a convexly curved profile having a single or multiple radiuses.

The tread portion T is provided with at least one circumferential groove 7, 8 extending continuously in the circumferential direction of the tire. The width W of the circumferential groove is more than 16% of the ground contacting width TW. Here, the ground contacting width TW is the axial width between the axially outermost points of the ground contacting region of the tread surface when the tire is mounted on its regular rim, inflated to its regular pressure, and loaded by its regular load. The regular rim is the rim officially recommended for the tire by, for example, TRA (USA), ETRTO (Europe), JATMA (Japan) and the like, and the regular inner pressure and the regular load are the maximum air pressure and the maximum tire load for the tire as officially specified in the Air-pressure/Maximum-load Table published by the same associations.

Figure 3:
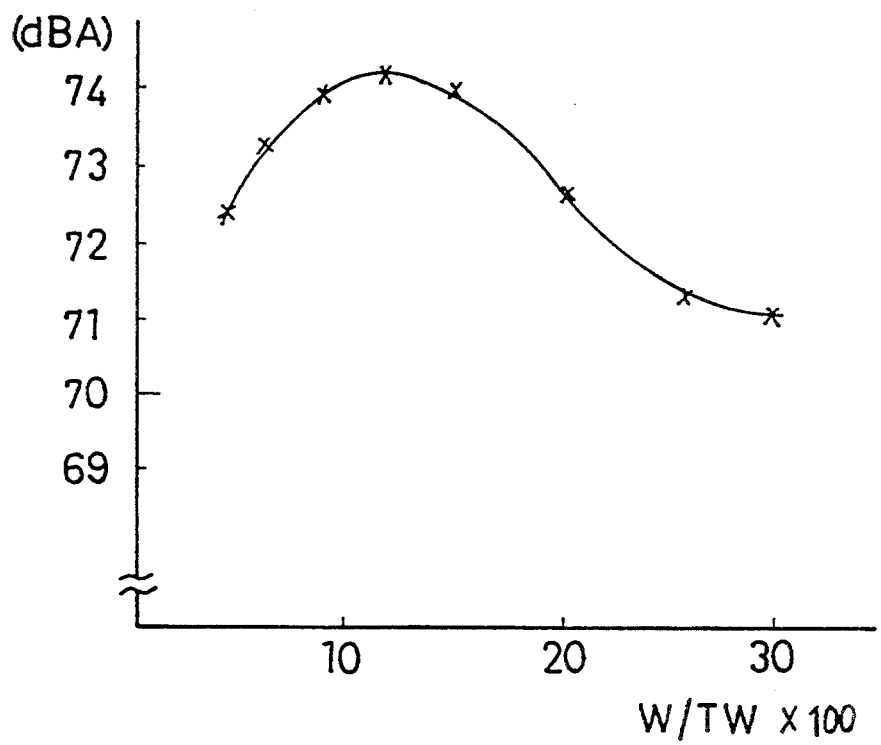
FIGS. 3 and 4 are graphs showing the results of noise tests.

FIG. 3 illustrates shows a test results showing the tire noise level as a function of the percentage (W/WT×100) of the groove width (W) to the ground contacting width (WT). The test was made using 205/55R15 tires provided with only one circumferential groove having a U-shaped cross section. Changing the width (W) of the circumferential groove, the running noise of the test tire was measured according to a JASO test procedure. The microphone position was 7.5 meters, the running speed was 60 km/h, and the test car was a Japanese made 2000 cc passenger car.

From the test results, it was confirmed that, in the range of under a certain value, the noise level of the tire can be decreased by decreasing the groove width (W). It was discovered that a solo peak lies around 13%, and in the range of over 13%, the noise level decreases with an increase in the groove width W. Further, the decreasing rate becomes appreciable from about 16%.

Figure 4:
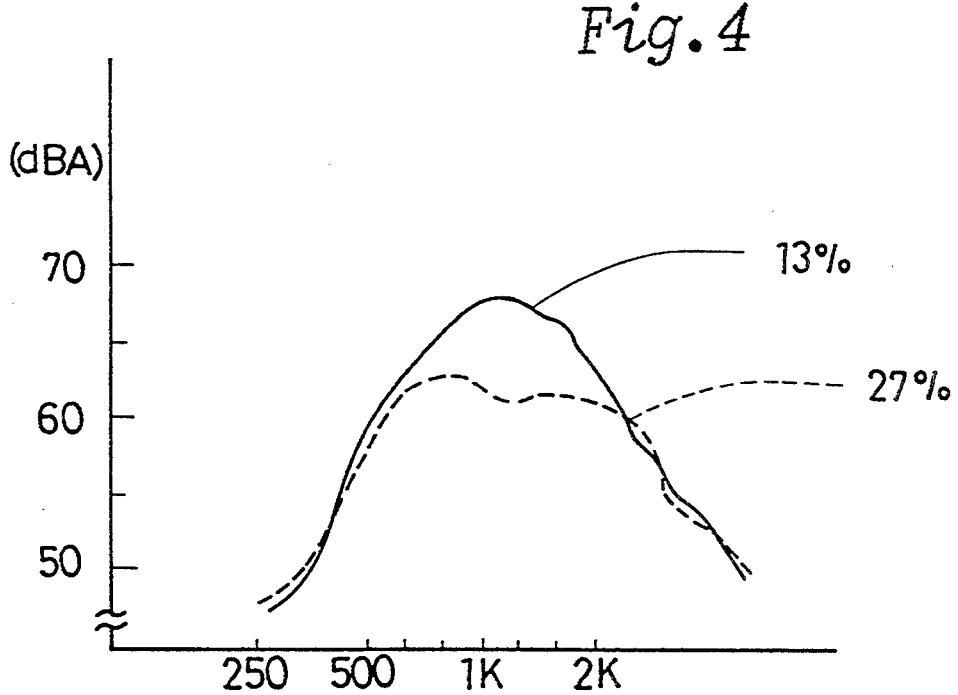

FIG. 4 shows the frequency spectrums at the peak (13%) and a higher percentage of 27%.

From this analysis, it became known that the noise of around 1 k Hz was appreciably decreased.

Thus, it was discovered that by setting the circumferential groove width over 16%, the harsh 1 k Hz noise is effectively reduced, and as a result, the overall tire noise can be effectively reduced. Therefore, as explained above, the width W of the circumferential groove ms set to be more than 16% of the ground contacting width TW.

As known from FIG. 3, if the width is smaller than 8% of TW, as the air resonance is controlled, a narrow circumferential groove may be used in combination with the above-mentioned wider circumferential groove.

In other words, the tread portion is not provided with any circumferential groove having a width in the range of between 8 to 16% of the ground contacting width TW. The depth of each of the circumferential grooves 7, 8 may be in the range of from 4 to 8% of the ground contacting width TW.

In the embodiment shown in FIG. 1, the tread surface T is defined by a crown part having a single radius R1 of curvature having a center on the tire equator, and a pair of shoulder parts having a single radius R2 of curvature which is smaller than the radius R1. The crown part is defined as the tire portion extending from the tire equator CL toward each side having a length of 30% of the ground contacting width TW. Each of the shoulder parts extends axially outwardly from each of the axial edges of the crown part, thereby covering 20% or more of the tread ground contacting width TW. The crown part and shoulder parts are connected without forming any inflection point.

Within the above-mentioned crown part, that is, within 60% of the width, two circumferential grooves 7 and 8 are disposed one on each side of the tire equator CL.

The widths W1 and W2 of the circumferential grooves 7 and 8, respectively, are more than 16% of the ground contacting width TW. However, one of them may be a smaller width of less than 8%, as explained above. Further, the total W1+W2) of the groove widths W1 and W2 is preferably set to be not more than 50% of the ground contacting width TW. If the total (W1+W2) is more than 50%, the dry grip, steering stability and the like are deteriorated.

Between the above-mentioned two circumferential grooves 7 and 8, a circumferentially extending continuous center rib 11 is formed on the tire equator. The width W3 of the center rib 11 is in the range of from between 5 to 15% of the ground contacting width TW. When the width W3 is less than 5%, the axial rigidity of the rib decreases which increases the noise produced by the rib. Further, the rib wears rapidly resulting in uneven wear.

On the axially outside of each of the circumferential grooves 8 and 7, a circumferentially extending continuous shoulder ribs 9 and 10 are formed.

In this embodiment, further, the circumferential groove 8 is formed as a straight groove, and the other circumferential groove 7 is formed as a zigzag groove. Accordingly, the tread pattern is not symmetrical with respect to the tire equator CL.

This asymmetrical tire is mounted in a car in such a manner that the straight circumferential groove 8 is located toward the outside of the car, and the zigzag circumferential groove 7 is located toward the inside of the car.

Since the shoulder rib 10 located axially outward of the straight groove 8 is provided with a larger rigidity than the other shoulder rib 9 located axially outward of the zigzag groove 7, the deformation and movement during cornering is controlled to improve steering stability. The zigzag circumferential groove 7 improves the wet grip due to a so called wiping effect of the zigzag edges. Since the straight groove generates less noise than the zigzag groove, such arrangement helps to decrease the tire while maintaining acceptable performance.

When the groove edge has a zigzag configuration as above, a wavy configuration or the like, in order to determine the above-mentioned widths W1, W3, etc., the center line of the amplitude thereof, that is, a straight circumferential line drawn in the center between the axially outermost point and the axially innermost point of the edge is used.

Figure 2:
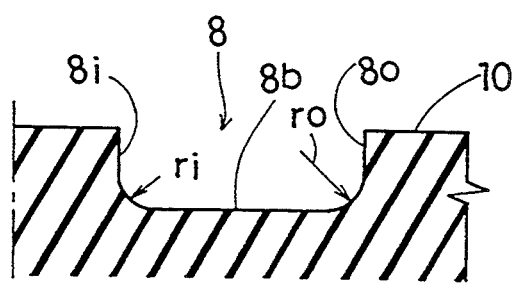
FIG. 2 is a cross sectional view of a circumferential groove of the pneumatic tire showing the section shape thereof.

The circumferential grooves 7 and 8 have a cross sectional shape as shown in FIG. 2. Groove 8 is shown as an example. The axially inner groove wall ($8i$) and the axially outer groove wall ($8o$) are perpendicular, and the groove bottom ($8b$) is flat. The corners therebetween are rounded. The radius (ro) of the curvature of the axially outer corner is in the range of between 1.5 to 3 times the radius (ri) of the curvature of the axially inner corner, whereby the shoulder rib 10 is increased in rigidity to improve the steering stability of the tire during cornering, and the center rib 11 is decreased in rigidity to improve ride comfort and wet grip.

Figure 5:
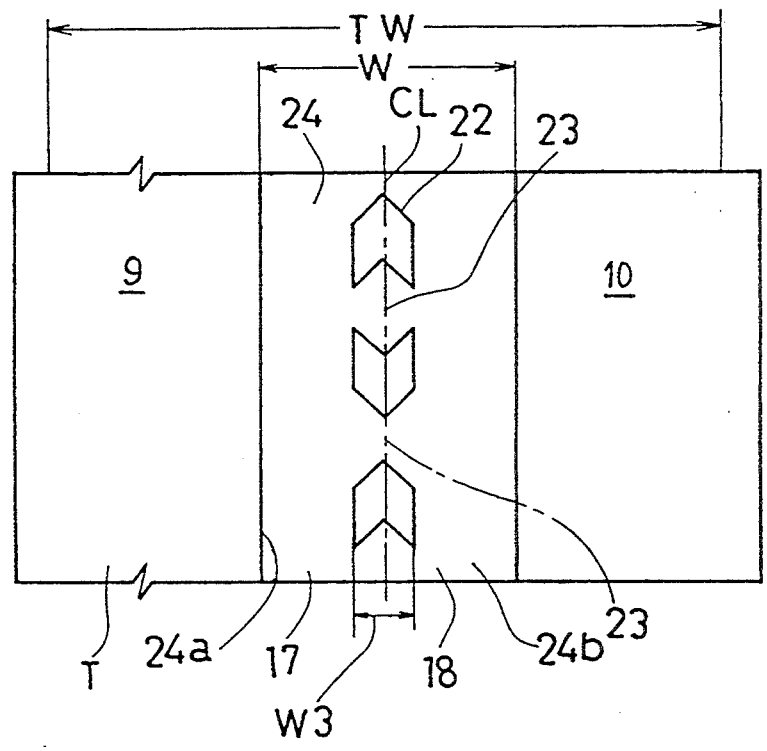
FIG. 5 is a plan view of another preferred embodiment of a pneumatic tire according to the present invention.

FIG. 5 shows another embodiment of the present invention. The above explained internal tire structure such as a carcass, belt etc., can be used here.

In the preferred second embodiment, the tread portion T is provided within the above-explained crown part (60% of the width central tread part) with a wide circumferential groove 24. The circumferential groove 24 has a width (W) of more than 25% of the ground contacting width (TW), and centered on the tire equator CL.

With such a very wide groove provided in the tread center, the groove is susceptible to deformation due to the tire load when in use. The carcass and belt are also susceptible to deformation.

In order to avoid such a deformation, the groove bottom $24b$ is provided with a plurality of circumferentially spaced load supporting protrusions 22. The height of each protrusion is substantially the same as the groove depth.

In the example shown in FIG. 5, the protrusions 22 are independent blocks disposed on the tire equator CL. The block has a pair of straight axial edges extending parallel with the tire equator and a pair of V-shaped bent circumferential edges extending parallel with each other, thereby having a configuration like the feathers of an arrow. With respect of the direction of the arrow, the blocks are alternately arranged in the circumferential direction.

The total ground contacting area of the protrusions 22 within the groove 24 is limited to less than 20% of the total groove top area (S) of the circumferential groove 24. The total groove top area (S) is calculated by multiplying the groove width (W) by the groove length along the tire circumference. If the total ground contacting area is more than 20%, the noise generated by the air flowing between the adjacent blocks and between the blocks and the adjacent groove wall increases, and the wet performance decreases.

More preferably, the total ground contacting area of the protrusions 22 is in the range of between 10 to 15% of the total groove top area (S).

Further, the width BW of the block or protrusion 22 is preferably in the range of between 5 to 15% of the ground contacting width TW.

Accordingly, the existence of the protrusions 22 within the groove prevents air resonance, and increases the overall ground contacting area so to prevent deterioration in dry grip performance, steering stability and wear performance.

The corners between the groove side walls 24a and groove bottom 24b are rounded.

By such arrangement, the wide groove 24 can be regarded as being made up of two narrow circumferentially extending groove parts 17 and 18 and axially extending groove parts 23 therebetween.

Figure 6:
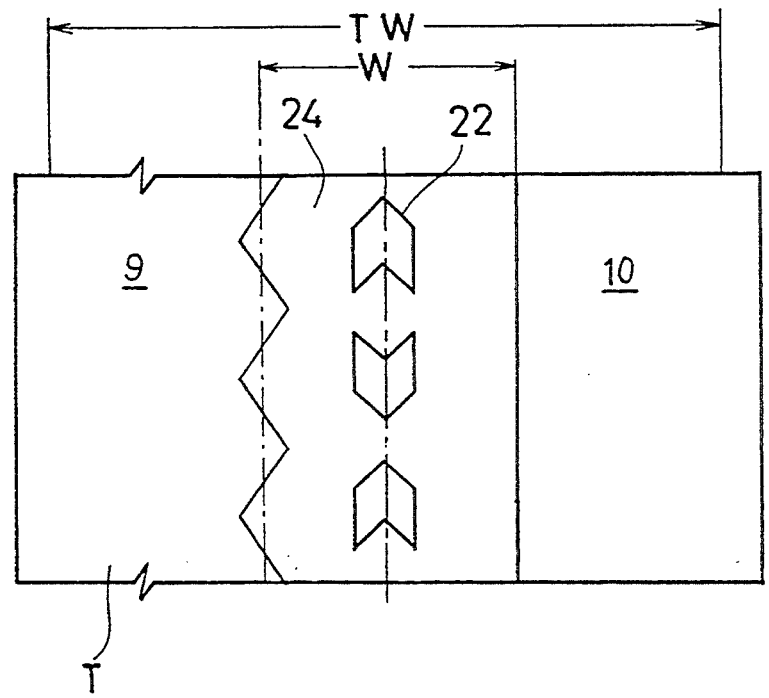
FIG. 6 is a plan view of another preferred embodiment of a pneumatic tire according to the present invention.

FIG. 6 shows a modification of the tread pattern shown in FIG. 5, wherein one of the groove edges is straight, but the other edge to be located toward the inside of the car for the same reason as explained above, is zigzag.

In the present invention, axial grooves, sipes (cut or narrow slit) and the like can be formed in the ribs such as the center rib 11 in the first embodiment and the shoulder ribs 9 and 10 in the first and second embodiments. It is understood that the foregoing description is the preferred embodiments of the applicant's invention. Certain modifications and or additions to the disclosed tire may be apparent to one of ordinary skill in the art without departing from the scope of the invention.

I claim:

1. A pneumatic tire comprising:
   a tread portion with tread edges, a pair of axially spaced bead portions, and sidewall portions extending therebetween;
   said tread portion including a crown part and a pair of shoulder parts which collectively have a convex profile, said crown part having a convex surface with a first radius of curvature measured from the center of the tire's equator, and each of said shoulder parts having a convex surface with a second radius of curvature which is less than said first radius;
   said tread portion provided with a circumferential groove extending continuously in the circumferential direction of the tire;
   said circumferential groove having a width of more than 25% of the ground contacting width;
   said circumferential groove provided in the groove bottom with a plurality of circumferentially spaced load supporting protrusions;
   each of said protrusions having a height substantially the same as the depth of the circumferential groove for enabling each of the protrusions to contact with the ground,
   the total ground contacting area of said protrusions being less than 20% of the total groove top area of said cirumferential groove.

2. The pneumatic tire according to claim 1, wherein the groove edge adjacent to one of the tread edges is straight, and the groove edge adjacent to the other tread edge is zigzag or wavy.

3. The pneumatic tire according to claim 1, wherein the width of each said plurality of protrusions is in the range of between 5 to 15% of the ground contacting width.

4. The pneumatic tire according to claim 1, wherein the circumferential groove is a straight groove.

5. The pneumatic tire according to claim 1, wherein the total ground contacting area of the plurality of protrusions is collectively in the range of between 10 to 15% of the total groove top area of the circumferential groove.

6. The pneumatic tire according to claim 1, wherein:
   each of said protrusions having a pair of axially spaced straight sides and a pair of v-shaped parallel sides for collectively forming an arrow-shaped protrusion.

7. The pneumatic tire according to claim 6, wherein:
   each of said plurality of protrusions being located on the tire circumferential equator in the groove bottom of the circumferential groove so that the direction of the v-shaped parallel sides alternate about the circumference of the tire.

8. The pneumatic tire according to claim 1,
   wherein the groove edge adjacent to one of the tread edges is straight, and the groove edge adjacent to the other tread edge has a zigzag shape.

* * * * *